United States Patent [19]

Bettin et al.

[11] 3,879,713

[45] Apr. 22, 1975

[54] TRANSMISSION OF SIGNALS BETWEEN A DATA PROCESSING SYSTEM AND INPUT AND OUTPUT UNITS

[75] Inventors: Hubertus Bettin, Braunschweig; Alfred Folta, Ilsede, both of Germany

[73] Assignee: Olympia Werke AG, Wilhelmshaven, Germany

[22] Filed: Oct. 17, 1973

[21] Appl. No.: 407,132

[30] Foreign Application Priority Data

Oct. 19, 1972 Germany .......................... 2251225

[52] U.S. Cl. ........................................ 340/172.5
[51] Int. Cl. ........................................ G06f 3/12
[58] Field of Search .................. 340/172.5, 324, 336

[56] References Cited

UNITED STATES PATENTS

| | | | |
|---|---|---|---|
| 3,462,742 | 8/1969 | Miller | 340/172.5 |
| 3,473,160 | 10/1969 | Wahlstrom | 340/172.5 |
| 3,579,201 | 5/1971 | Langley | 340/172.5 |
| 3,641,511 | 2/1972 | Cricchi et al. | 340/173 |
| 3,737,866 | 6/1973 | Gruner | 340/172.5 |
| 3,771,132 | 11/1973 | Biewer | 340/172.5 |

*Primary Examiner*—Gareth D. Shaw
*Assistant Examiner*—J. P. Vandenburg
*Attorney, Agent, or Firm*—Spencer & Kaye

[57] ABSTRACT

A circuit arrangement for transmitting signals between a data processing unit and external input and output units. The data processing unit has a plurality of terminals. A plurality of first switching circuits are provided, each being connected to a respective one of the terminals. These first switching circuits, in their normal position, connect the terminals to the output unit. A control circuit is connected to the input unit and provides control signals in response to a determination that information to be supplied to the data processing unit is present at the input unit. The control circuit in response to such a determination causes the switching circuits to temporarily switch so as to connect the input unit to the data processing unit.

8 Claims, 1 Drawing Figure

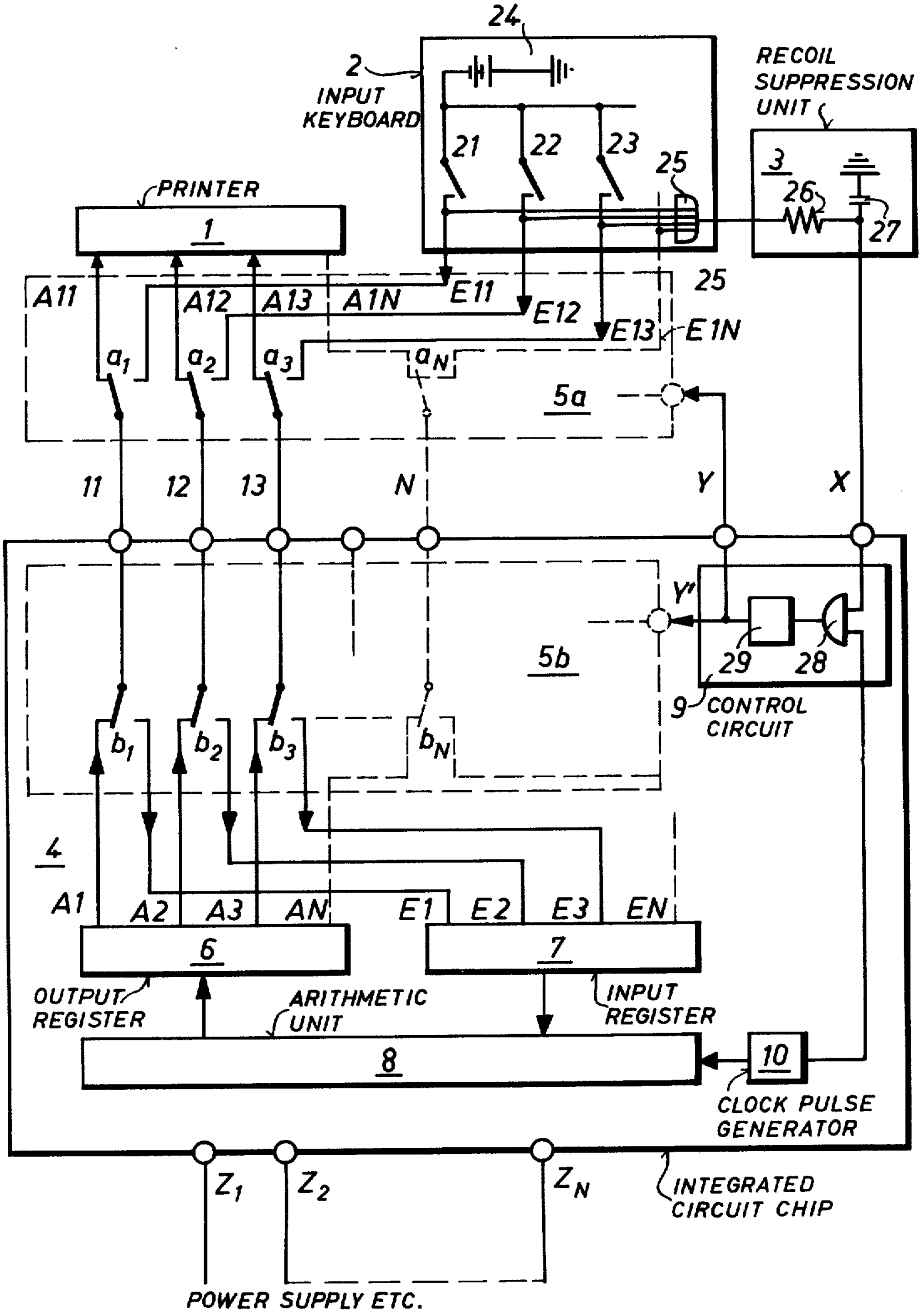
24
2
INPUT
KEYBOARD
21
22
23
25
RECOIL
SUPPRESSION
UNIT
3
26
27
PRINTER
1
A11
A12
A13
A1N
E11
E12
E13
E1N
25
a1
a2
a3
aN
5a
11
12
13
N
Y
X
Y'
5b
29
28
9
CONTROL
CIRCUIT
b1
b2
b3
bN
4
A1
A2
A3
AN
E1
E2
E3
EN
6
7
OUTPUT
REGISTER
ARITHMETIC
UNIT
INPUT
REGISTER
8
10
CLOCK PULSE
GENERATOR
Z1
Z2
ZN
INTEGRATED
CIRCUIT CHIP
POWER SUPPLY ETC.

TRANSMISSION OF SIGNALS BETWEEN A DATA PROCESSING SYSTEM AND INPUT AND OUTPUT UNITS

BACKGROUND OF THE INVENTION

The present invention relates to a circuit arrangement for transmitting signals between a data processing unit and external input and output units for this system.

With the advent of modern semiconductor technology, it has become highly advantageous to be able to fully utilize the MOS processing techniques in the construction of circuit arrangements. Accordingly, it has become desirable to construct mainly all of the circuit elements of a table model calculator in a large scale integrated circuit. While it is possible to significantly reduce the size of the calculator by the use of integrated circuitry, a problem arises as to the maximum possible number of terminals which can be arranged in the available space on the integrated circuit chip.

SUMMARY OF THE INVENTION

An object of the present invention is to provide a circuit arrangement with which the terminals of a data processing unit, such as, for example, a calculator, can be utilized both as the input and output terminals of the system, even when input and output signals are simultaneously present, without the loss of any information.

This and other objects of the invention are accomplished by providing a circuit arrangement which selectively switches the terminals between input and output units. A switching circuit is connected with each of the terminals of the data processing unit. The switching circuits, in their normal state, connect the terminals to the ouput unit and, when activated, connect the terminals to the input unit. A control circuit is coupled to the input unit and when the control circuit determines the presence at the input unit of information to be supplied to the data processing unit, the circuit activates the switching circuits so as to temporarily connect the terminals to the input unit. When the control signals from the control circuit are removed from the switching circuits, the terminals are automatically reconnected to the output unit.

The output unit, which is connected to the data processing unit, is an electromechanical unit, such as, for example, a printing unit. Such electromechanical units operate relatively slowly as compared with the input unit and, therefore, it is preferable to have the output unit normally connected to the terminals of the system. When both input and output signals are simultaneously present, the flow of the output signals can be temporarily interrupted for the duration of flow of the input signals, which is, for example, approximately 40 us. This process interrupts the flow of output signals for such a short time that none of the information content of the output signals is lost and thus there is no adverse influence on the operational dependability of the output unit.

The circuit arrangement, therefore, provides for maximum utilization of the terminals of the data processing unit, thereby permitting better utilization of the integrated circuitry of the system.

BRIEF DESCRIPTION OF THE DRAWINGS

The single FIGURE is a schematic circuit diagram of one preferred embodiment of the present invention.

DESCRIPTION OF THE PREFERRED EMBODIMENTS

In the single FIGURE, an integrated circuit chip 4 is shown which has terminals 11, 12, 13 . . . N, X, Y, $Z_1$, $Z_2$ . . . $Z_N$, the terminals 11, 12, 13 . . . N being connected with the wiper sides of respective external electronic switches $a_1, a_2, a_3, \ldots a_N$ and with the wiper sides of respective internal electronic switches $b_1, b_2, b_3, \ldots b_N$. The switches are shown in the drawing only symbolically and are intended to represent electronic change-over switches. The integrated circuit chip 4 preferably comprises circuitry of an electronic calculator, or any other type of a data processing system. Terminals X and Y are permanent control signal connections, and terminals $Z_1$, $Z_2$ . . . are permanent connections to a power supply, or any other type of connections which may not be operated in a time multiplex fashion.

The electronic switches $b_1, b_2, \ldots b_N$ are disposed in the integrated circuit chip 4 and are components of an internal switching circuit 5*b*. The electronic switches $b_1, b_2, \ldots b_N$ each have one fixed contact connected to an internal output means 6, preferably an output register, via lines A1, A2, A3, . . . AN, respectively, and each have their other fixed contact connected to an input means 7, preferably an input register, via lines E1, E2, E3, . . . EN, respectively. The chip 4 also includes an arithmetic unit 8, a control circuit 9 and a clock pulse generator 10. The clock pulse generator 10 is connected to both the arithmetic unit 8 and the control circuit 9 and, therefore, the operations of both are synchronized. The arithmetic unit 8 is also connected in a known manner with the input register 7 and the output register. The control circuit 9, consisting of an AND-gate, 28 and a one-shot multivibrator 29, controls the operation of the internal switching circuit 5*b*, and thus of the electronic switches $b_1, b_2 \ldots b_N$, by control signals applied via a line Y'.

The terminals 11, 12, . . . N of the chip 4 are externally connected with the electronic switches $a_1, a_2, \ldots a_N$. The electronic switches $a_1, a_2, \ldots a_N$, which are components of an external switching circuit 5*a*, are connected with the external output unit 1, preferably a printer, via connections A11, A12, A13, . . . A1N, respectively, and with the external input unit 2, preferably an input keyboard, via connections E11, E12, E13, . . . E1N respectively. Switches $a_1$ to $a_N$ are controlled by signals supplied by control circuit 9 via line Y.

The terminals 11, 12, . . . N are switched between input and output states in a time multiplex operation as described below. The electronic switches $_1, a_2, \ldots a_N$ and the electronic switches $b_1, b_2, \ldots b_N$ are in a state, when no data information is being fed in through the input keyboard 2, which keeps the output register 6 and the output unit 1 in a continuously conductively connected relationship. When one of the input keyboard contacts 21, 22, 23 of the input keyboard 2 has been actuated, the voltage potential of a bias source 24 is connected to the corresponding line E11, E12, E13 or E1N. Via an OR-gate 25 this signal also reaches a recoil suppression unit 3, consisting essentially of an R-C-delay circuit. After the vibrations of the keyboard contacts have died out, an output signal of the recoil suppression unit 3 enables input line X of the AND-gate 28 of control circuit 9. The other input of the AND-gate 28 is fed with clock pulse signals by the clock pulse generator 10, as is the arithmetic unit 8. The output signal triggers the one-shot multivibrator 29 which sends the corresponding switching control signals to the external electronic switches $a_1, a_2, \ldots a_N$ via line Y and to the internal electronic switches $b_1, b_2, \ldots b_N$ via line Y'. The terminals 11, 12, . . . N, therefore, are temporarily switched to an input state in that the input keyboard 2 and the input register are conductively connected together. After a relatively short period of time, which is sufficient to permit the input signals to pass to register 7, the one-shot multivibrator 28 is reset, and the electronic switches $a_1, a_2, \ldots a_N$ and the electronic switches $b_1, b_2, \ldots b_N$ are switched back to their normal output state.

It will be understood that the above description of the present invention is susceptible to various modifications, changes and adaptations and the same are intended to be comprehended within the meaning and range of equivalents of the appended claims.

We claim:

1. A circuit arrangement for transmitting signals between a data processing means and external input means and external electromechanical output means, said arrangement comprising, in combination: a plurality of terminals connected to said data processing means; a plurality of first switching means, each associated with a respective one of said terminals, said first switching means normally connecting their respective terminals with said external electromechanical output means; and control means having its input coupled to said external input means to determine the presence, at said external input means, of information to be supplied to said data processing means and in response thereto switching said first switching means for causing said terminals to be temporarily connected to said external input means.

2. An arrangement as defined in claim 1 wherein said data processing means is in the form of an integrated circuit.

3. An arrangement as defined in claim 1 wherein said data processing means comprises an internal input means, an internal output means and a plurality of second switching means, each associated with a respective one of said terminals for selectively connecting one of said internal output and input means to said terminals, said second switching means normally connecting said internal output means to said terminals; and said control means being connected to said second switching means for causing said internal input means to be temporarily connected to said terminals during the times when said external input means are connected to said terminals.

4. An arrangement as defined in claim 3, wherein said internal output and input means are output and input registers, respectively.

5. A circuit arrangement as defined in claim 4, further comprising recoil suppression means, and wherein said external input means includes an input keyboard having a plurality of contacts, and said recoil suppression means connects said input keyboard to the input of said control means, so that said external input means only provides input signals to said control means after any vibrations of said contacts of said keyboard have died out.

6. A circuit arrangement for transmitting data signals between a data processing unit, including an internal data input means and an internal data output means, and external input and electromechanical output units, said arrangement comprising in combination:

a plurality of input/output data terminals for said data processing unit;

a like plurality of first switching means, each associated with a respective one of said data terminals, for connecting said data terminals to said external electromechanical output unit when in a first position and for connecting said data terminals to said external input unit when in a second position, each of said first switching means normally being in said first position;

a like plurality of second switching means, disposed within said data processing unit and each associated with a respective one of said data terminals, for connecting said data terminals to said internal data output means when in a first position and for connecting said data terminals to said internal data input means when in a second position, each of said second switching means normally being in said first position; and control means coupled to said external input unit and responsive to the presence, at said external input unit, of data to be supplied to said data processing unit for temporarily switching all of said first and second switching means to said second position, thereby causing said data terminals to be temporarily connected between said external input unit and said internal data input means, and for thereafter returning all of said first and second switching means to said first position, thereby causing said data terminals to be connected between said external electromagnetic output unit and said internal data output means.

7. A circuit arrangement as defined in claim 6 wherein: said data processing unit includes a clock pulse generator means for controlling the operation of same; and said control means includes an AND-gate having one input connected to the output of said clock pulse generator means and a second input connected to said external data input unit, and a control pulse generator means having its input connected to the output of said AND-gate and its output connected to all os said switching means, said control pulse generator means being responsive to an output signal from said AND-gate for providing an output pulse to control the position of said switching means.

8. A circuit arrangement defined in claim 7 wherein said control pulse generator means is a one shot multivibrator.

* * * * *